United States Patent [19]

Foral, Jr. et al.

[11] 3,855,337

[45] Dec. 17, 1974

[54] METHOD OF REMOVING AND RECOVERING AROMATIC HYDROCARBONS AND WATER FROM A GAS STREAM

[75] Inventors: Adolph J. Foral, Jr.; Phillip N. Batdorf, both of Houston, Tex.

[73] Assignee: Black, Sivalls & Bryson, Inc., Houston, Tex.

[22] Filed: Oct. 17, 1973

[21] Appl. No.: 407,077

[52] U.S. Cl............ 260/674 R, 55/88, 208/341, 208/343, 208/346
[51] Int. Cl............................................ C07c 7/00
[58] Field of Search............ 208/343, 341, 346; 260/674 R; 55/88

[56] References Cited
UNITED STATES PATENTS

| | | | |
|---|---|---|---|
| 1,560,138 | 11/1925 | Bernard | 208/341 |
| 1,743,185 | 1/1930 | Bernard | 208/343 |
| 3,188,287 | 6/1965 | Hull | 208/346 |
| 3,267,028 | 8/1966 | McHarg | 208/341 |
| 3,312,749 | 4/1967 | Hess et al. | 208/346 |
| 1,457,786 | 6/1923 | Merriam | 208/341 |

Primary Examiner—Delbert E. Gantz
Assistant Examiner—C. E. Spresser
Attorney, Agent, or Firm—C. Clark Dougherty, Jr.

[57] ABSTRACT

The present invention relates to a method of simultaneously removing and recovering aromatic hydrocarbons and water from a gas stream wherein the gas stream is intimately contacted with a stream of liquid absorbent so that the aromatic hydrocarbons and water contained therein are selectively absorbed and removed therefrom. The resultant stream of water and aromatic hydrocarbon rich liquid absorbent is heated in a reboiler so that the absorbed components are vaporized and separated therefrom and the stream of liquid absorbent is reconcentrated. The separated aromatic hydrocarbon and water vapors are withdrawn and recovered and the reconcentrated liquid absorbent is recycled into intimate contact with the gas stream.

20 Claims, 2 Drawing Figures

METHOD OF REMOVING AND RECOVERING AROMATIC HYDROCARBONS AND WATER FROM A GAS STREAM

BACKGROUND OF THE INVENTION

1. Field of the Invention

The present invention relates to the art of removing desired components from gas streams by contacting the gas streams with selective absorbent materials, and more paricularly, but not by way of limitation, to a method of simultaneously removing and recovering aromatic hydrocarbons and water from a gas stream by contacting the gas stream with a liquid absorbent.

2. Description of the Prior Art

Many various methods of removing water from gas streams have been developed and used successfully. A particularly suitable method which has achieved general acceptance involves contacting the gas stream with a liquid absorbent such as an aqueous glycol solution so that the water is selectively absorbed and removed from the gas stream. The water rich liquid absorbent is reconcentrated, generally by the addition of heat thereto, and then recycled back into contact with the gas stream.

Many gas streams contain relatively small quantities of vaporized aromatic hydrocarbons as well as water vapor, and it is often desirable to remove both the aromatic hydrocarbons and water from such gas streams. For example, in the liquefaction of natural gas streams, the presence of aromatic hydrocarbons and water therein presents problems in that both of these components have high freezing points and form hydrates which can plug off or otherwise damage heat exchangers and the liquefaction equipment.

Heretofore, elaborate separate processes have been required for removing aromatic hydrocarbons and water from such a gas stream. That is, the gas stream is passed through a first system of equipment wherein the aromatic hydrocarbons are removed by contacting it with a liquid or solid desiccant having a selective affinity for aromatic hydrocarbons. The water is then removed from the gas stream by passing it through a second system of equipment wherein it is contacted with a different liquid or solid desiccant having an affinity for water.

By the present invention, a method of simultaneously removing and recovering aromatic hydrocarbons and water from a gas stream is provided which can be carried out in a single system of equipment, which system is economical to install and operate.

SUMMARY OF THE INVENTION

The present invention relates to a method of removing and recovering aromatic hydrocarbons and water from a gas stream which comprises the steps of intimately contacting the gas stream with a stream of liquid absorbent so that both aromatic hydrocarbons and water contained therein are selectively and simultaneously absorbed and removed therefrom, heating the resultant stream of water and aromatic hydrocarbon-rich liquid absorbent in a reboiler so that the absorbed aromatic hydrocarbons and water are vaporized and separated therefrom and the stream of liquid absorbent is reconcentrated, withdrawing the separated hydrocarbon and water vapors, and recycling the reconcentrated liquid absorbent into initimate contact with the gas stream.

It is, therefore, a general object of the present invention to provide a method of removing and recovering aromatic hydrocarbons and water from a gas stream.

A further object of the present invention is the provision of a method of simultaneously removing and recovering aromatic hydrocarbons and water from a gas stream which can be carried out using a single system of apparatus.

A further object of the present invention is the provision of a method of simultaneously removing and recovering aromatic hydrocarbons and water from a gas stream which can be economically carried out in relatively inexpensive apparatus.

Other and further objects, features and advantages of the present invention will be apparent to those skilled in the art upon a reading of the description of preferred embodiments which follows when taken in conjunction with the accompanying drawings.

DESCRIPTION OF PREFERRED EMBODIMENTS

Figure 1:
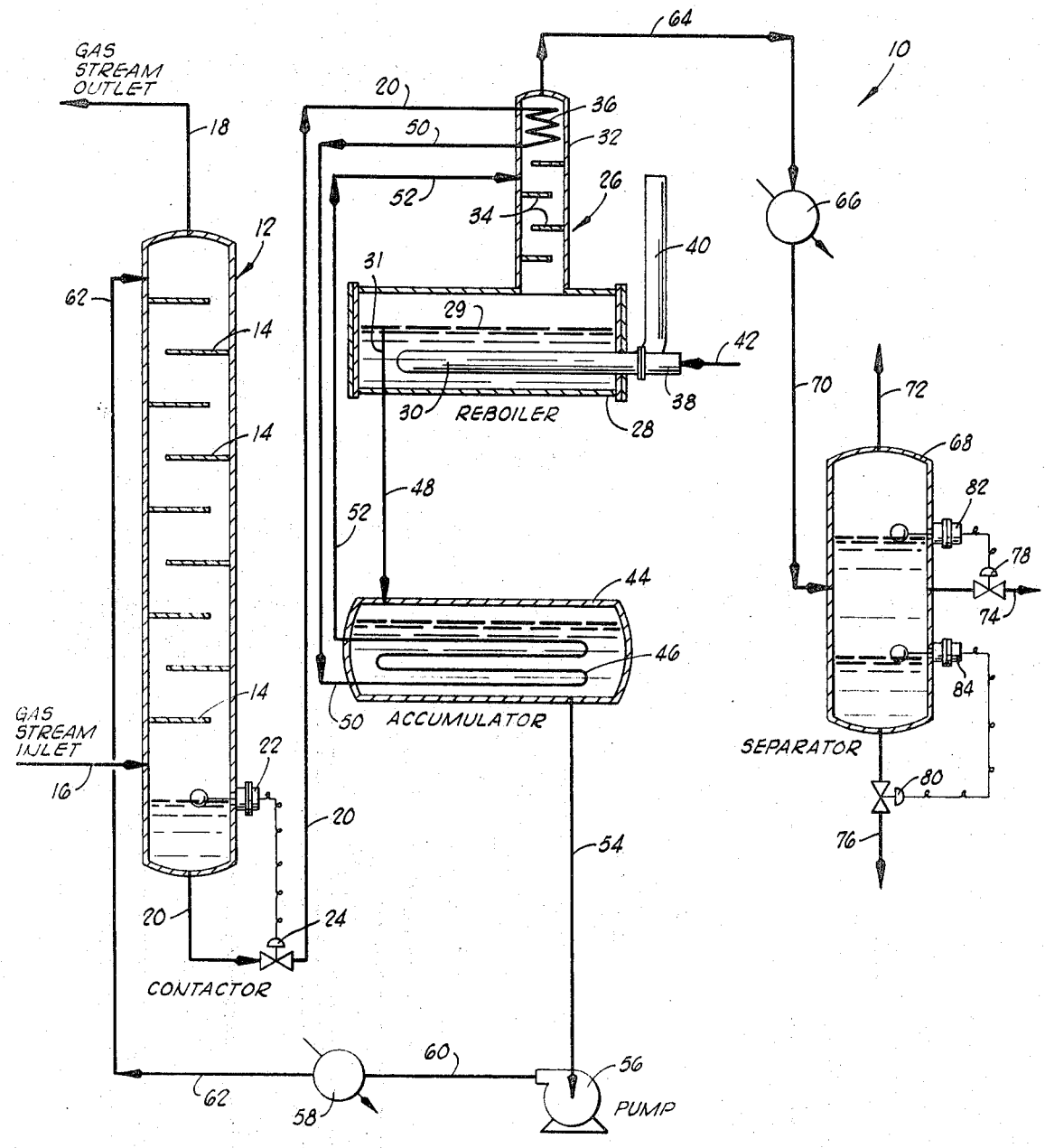
FIG. 1 is a diagrammatic illustration of a system of apparatus which can be utilized for carrying out the method of the present invention.

Referring now to the drawings, and particularly to FIG. 1, a system of apparatus which can be used for carrying out the method of the invention is illustrated and generally designated by the numeral 10. The system 10 includes a gas stream-liquid absorbent contactor 12 having a plurality of conventional vapor-liquid contact trays 14 or the equivalent secured therein. A conduit 16 for conducting the inlet gas stream to the system 10 is connected to the bottom portion of the contactor 12, and a conduit 18 for withdrawing the treated gas stream from the system 10 is attached to the top portion of the contactor 12. As will be understood by those skilled in the art, the contactor 12 may take a variety of forms and may include packing material or other devices in lieu of the trays 14 for bringing about intimate contact between the gas stream to be treated and the liquid absorbent used.

Rich liquid absorbent accumulating in the bottom portion of the contactor 12 is withdrawn therefrom by way of a conduit 20 attached thereto. A conventional liquid level controller 22 is provided connected to the contactor 12 which is operably connected to a conventional liquid level control valve 24 disposed in the conduit 20.

A liquid absorbent reboiler assembly 26 is provided for regenerating the rich liquid absorbent withdrawn from the contactor 12 by way of the conduit 20. The reboiler 26 may take a variety of forms, but preferably is comprised of a reboiler vessel 28 having a firebox 30 disposed therein and a still column 32 attached thereto. The still column 32 includes a plurality of conventional vapor-liquid contact trays 34 or the equivalent disposed therein with a reflux condensing coil 36 positioned above the trays 34. The open bottom portion of the still column 32 is connected directly to the reboiler vessel 28, and a conventional burner assembly 38 and stack 40 are connected to the firebox 30 in a conventional manner. Fuel is supplied to the burner assembly 38 by way of a conduit 42 attached thereto.

A liquid absorbent accumulator or surge vessel 44 is provided having a heat exchange coil 46 disposed therein. A conduit 48 connects the bottom portion of the reboiler vessel 28 to the accumulator 44.

The conduit 20 connects the bottom of the contactor 12 to the inlet connection of the reflux condensing coil 36 disposed within the still column 32. The outlet connection of the coil 36 is connected by a conduit 50 to the inlet connection of the heat exchange coil 46 disposed within the accumulator 44. The outlet connection of the heat exchange coil 46 is connected by a conduit 52 to an inlet connection in the still column 32. A conduit 54 connects the accumulaor 44 to the suction connection of a conventional liquid absorbent pump 56. The discharge connection of the pump 56 is connected to a conventional liquid absorbent cooling apparatus 58, such as an air or water heat exchanger, by a conduit 60. A conduit 62 connects the cooler 58 to a liquid absorbent inlet connection disposed in the top portion of the contactor 12.

An outlet connection disposed in the top portion of the still column 32 is connected by a conduit 64 to a conventional vapor condenser apparatus 66, e.g., an air or water cooled heat exchanger. The condenser 66 is connected to a three-phase separator 68 by a conduit 70. Uncondensed vapors are withdrawn from the separator 68 by a conduit 72 attached thereto, and liquid withdrawal conduits 74 and 76 are provided having liquid level control valves 78 and 80 disposed therein respectively. Liquid level control assemblies 82 and 84 are provided connected to the separator 68 which are operably connected to the control valves 78 and 80 respectively.

OPERATION OF THE SYSTEM 10

In operation of the system 10 for carrying out the method of the present invention wherein aromatic hydrocarbons and water are removed from a gas stream, the gas stream containing aromatic hydrocarbons and water is conducted to the system 10 by way of the conduit 16 and enters the bottom portion of the contactor 12. As the gas stream passes upwardly through the vapor-liquid contact trays 14 disposed within the contactor 12, it is contacted by liquid absorbent passing downwardly therein, which has an affinity for both water and aromatic hydrocarbons. A particularly suitable such liquid absorbent has been found to be an aqueous solution of triethylene glycol or tetraethylene glycol.

The intimate contact between the gas stream and the liquid absorbent brings about the absorption of both water and aromatic hydrocarbons contained in the gas stream thereby removing substantially all of these components from the gas stream. The thus treated gas stream reaching the top of the contactor 12 is withdrawn from the contactor 12 by way of the outlet conduit 18 connected thereto.

The resulting aromatic hydrocarbon and water-rich liquid absorbent accumulating in the bottom portion of the contactor 12 is withdrawn therefrom by way of the conduit 20. As will be understood, the liquid level controller 22 senses the level of the body of rich liquid absorbent accumulating in the bottom portion of the contactor 12 and opens and closes the liquid level control valve 24 in a manner such that a constant level of rich liquid absorbent is maintained therein. The continuous stream of rich liquid absorbent being withdrawn from the contactor 12 is conducted by the conduit 20 to the reflux condensing coil 36 disposed within the still column 32 of the reboiler 26. As the cool rich liquid absorbent passes through the coil 36 it exchanges heat with aromatic hydrocarbons, water, absorbent and other hydrocarbon vapors passing upwardly through the still column 32 so that portions of the vapors are condensed and function to reflux the still column 32 in a conventional manner. The stream of rich liquid absorbent is withdrawn from the coil 36 by way of the conduit 50 and is conducted to the heat exchange coil 46 disposed within the accumulator 44. While passing through the coil 46, the rich liquid absorbent is heated by exchanging heat with the hot lean liquid absorbent flowing through the accumulator 44 from the reboiler system 26. The thus preheatd stream of rich liquid absorbent is withdrawn from the coil 46 by way of the conduit 52 and is conducted to the still column 32. As the rich liquid absorbent flows downwardly within the still column 32 over the vapor-liquid trays 34 disposed therein it is contacted by hot vapors passing upwardly therein which causes the absorbed aromatic hydrocarbons and water to be vaporized and removed therefrom. From the still column 32, the resulting lean liquid absorbent flows into a body of continuously heated lean liquid absorbent 29 maintained within the reboiler vessel 28 by a standpipe 31 or other similar device. Heat is transferred into the body of liquid absorbent 29 through the firebox 30. The heat is generated by the combustion of fuel in the burner assembly 38 thereby forming hot products of combustion which flow through the firebox 30 and out the stack 40 in a conventional manner.

The continuous stream of hot lean liquid absorbent produced in the reboiler system 26 is withdrawn therefrom by way of the conduit 48 and conducted to the accumulator 44. While flowing through the accumulator 44, the hot lean liquid absorbent exchanges heat with the rich liquid absorbent passing through the heat exchange coil 46 disposed therein so that the rich liquid absorbent is preheated and the lean liquid absorbent cooled. The resulting stream of relatively cool lean liquid absorbent is withdrawn from the accumulator 44 by the conduit 54 and conducted to the suction connection of the pump 56. The pump 56 pumps the stream of lean liquid absorbent by way of the conduit 60 through the cooler 58 wherein it is cooled further to a desired temperature. From the cooler 58 the stream of lean liquid absorbent flows by way of the conduit 62 into the top portion of the contactor 12.

The aromatic hydrocarbon and water vapors removed from the rich liquid absorbent in the still column 32 are withdrawn therefrom by way of the conduit 64 attached thereto. The conduit 64 conducts the vapors to the condenser 66 wherein both the aromatic hydrocarbon and water vapors are condensed. The resulting mixture of aromatic hydrocarbon liquid and water produced in the condenser 66 is conducted therefrom by the conduit 70 into the three-phase separator 68. While flowing through the three-phase separator 68 the water and liquid aromatic hydrocarbons are separated, with the water being withdrawn from the separator 68 by way of the conduit 76, and the liquid aromatic hydrocarbons withdrawn by way of the conduit 74. The liquid level controller 84 and control valve 80 function in a conventional manner to maintain a level of water within the separator 68 and the liquid level controlller 82 and control valve 78 function to maintain a body of liquid aromatic hydrocarbons therein. Any uncondensed hydrocarbons or other vapors produced are withdrawn from the separator 68 by way of the conduit 72.

Thus, the method of the present invention as carried out in the system 10 can be utilized to continuously and simulaneously remove both aromatic hydrocarbons and water from a gas stream and recover them in liquid form. The recovery of the aromatic hydrocarbons is advantageous in that such hydrocarbons can be utilized or sold thereby producing a revenue which offsets the operating costs of the system 10.

Figure 2:
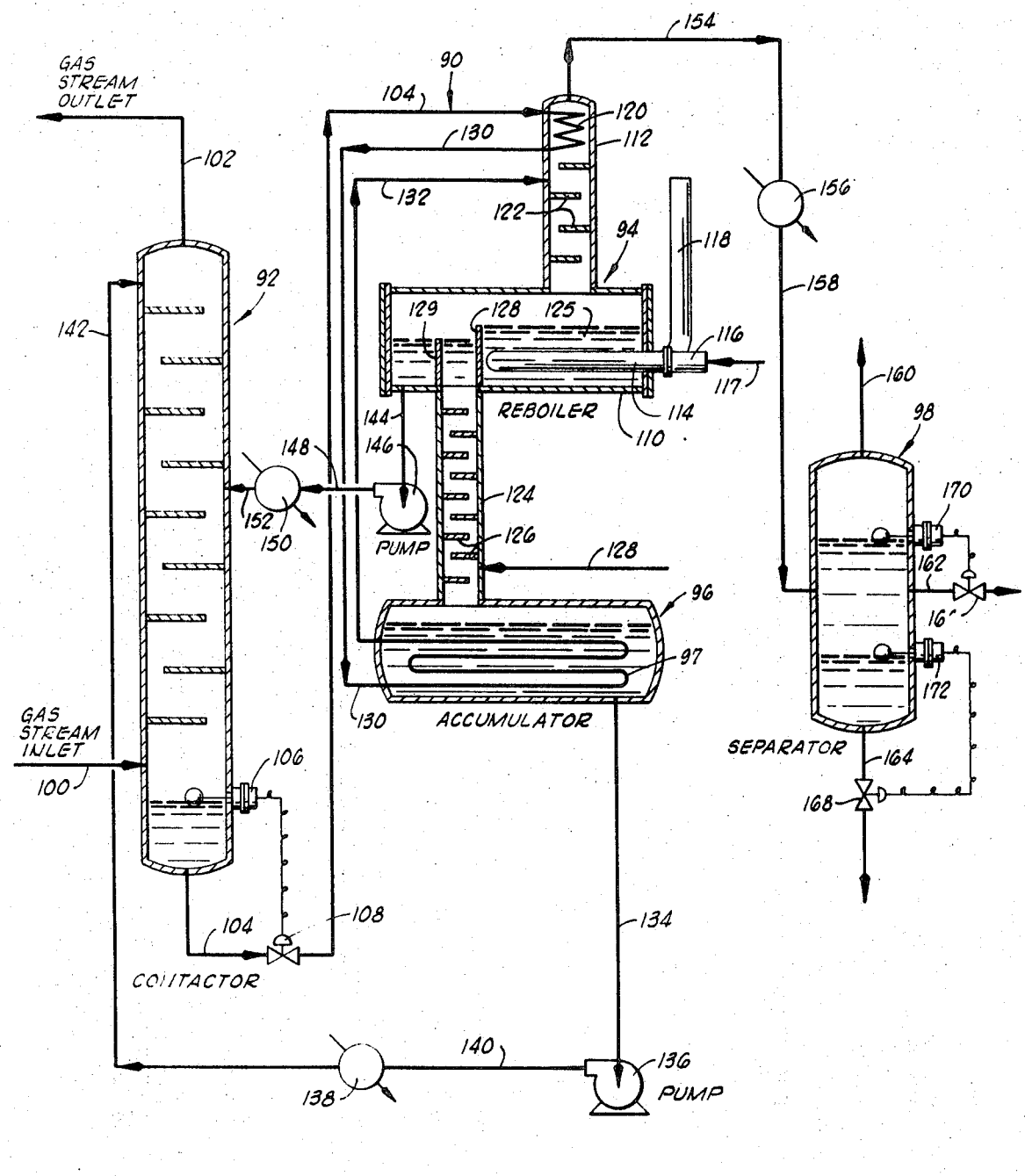
FIG. 2 is a diagrammatic view of an alternate system of apparatus which can be used for carrying out the method of the present invention.

Referring now to FIG. 2, an alternate system of apparatus which can be utilized for carrying out the method of the present invention is illustrated and generally designated by the numeral 90. The system 90 is similar to the system 10 previously described in that it includes a contactor 92, a reboiler system 94, an accumulator 96 and a three-phase aromatic hydrocarbonwater separator 98.

The inlet gas stream containing aromatic hydrocarbons and water is conducted to the lower portion of the contactor 92 by a conduit 100. The contactor 92 includes a plurality of vapor-liquid trays or their equivalent for bringing about intimate contact between the gas stream passing upwardly therewithin and lean liquid absorbent passing downwardly. The treated gas stream is withdrawn from the contactor 92 by a conduit 102 connected to the top portion of the contactor 92, and rich liquid absorbent is withdrawn from the contactor 92 by way of a conduit 104 attached to the bottom portion thereof. A liquid level controller 106 is attached to the bottom portion of the contactor 92 and a liquid level control valve 108 is disposed within the conduit 104 operably connected to the controller 106.

The reboiler system 94 is similar to the reboiler system 26 previously described in that it includes a reboiler vessel 110 having a still column 112 connectd thereto and having a firebox 114 disposed therein. A burner assembly 116 and stack 118 are connected to the firebox 114. The still column 112 includes a reflux condensing coil 120 disposed in the top portion thereof and a plurality of vapor-liquid contact trays 122 or the equivalent disposed therein.

A stripping gas column 124 having a plurality of vapor-liquid trays 126 or the equivalent disposed therein is provided. preferably, the stripper column 124 is attached directly to the reboiler vessel 110 and to the lean liquid absorbent accumulator 96 so that liquid absorbent is caused to flow from the rearward end of the reboiler vessel 110 through the stripping gas column 124 and into the accumulator 96. In order to insure that a body of liquid absorbent 125 maintained within the reboiler vessel 110 above the firebox 114, one or more weirs 128 are provided disposed within the vessel 110 so that the liquid absorbent is caused to flow from the body 125 thereof into a subsequent chamber or area 129 located rearwardly of the firebox 114.

A stream of relatively dry stripping gas is conducted to the lower portion of the stripping column 124 by a conduit 128 connected thereto and to a source of stripping gas. The source of the stripping gas may be the treated gas leaving the contactor 102, or a portion of the fuel gas conducted to the burner 116 by way of the conduit 117 may be used. The stream of stripping gas used is preferably preheated prior to being injected into the column 124.

The rich liquid absorbent withdrawn from the contactor 92 is conducted by way of the conduit 104 into the inlet connection of the reflux condensing coil 120 disposed within the still column 112. A conduit 130 connects the outlet of the coil 120 to the inlet connection of the heat exchange coil 98 disposed within the accumulator 96, and the outlet of the heat exchange coil 98 is connected by a conduit 132 to an inlet connection in the still column 112.

The bottom portion of the accumulator 96 is connected by a conduit 134 to the suction of a conventional pump 136. The discharge of the pump 136 is connectd to the inlet of a conventional liquid absorbent cooling apparatus 138 by a conduit 140. The outlet of the cooler 138 is connected by a conduit 142 to an inlet connection in the top portion of the contactor 92. A conduit 144 connects the rearward chamber 129 of the reboiler vessel 110 to the suction of a conventional pump 146. The discharge of the pump 146 is connected by a conduit 148 to a conventional liquid absorbent cooling apparatus or heat exchanger 150. The outlet of the cooler 150 is connected by conduit 152 to an inlet connection disposed in the contactor 92 at an intermediate point therein.

A conduit 154 is attached to an outlet connection in the still column 112 and to the inlet connection of a conventional vapor condenser 156. The outlet of the condenser 156 is connected by a conduit 158 to the three-phase separator 98. The separator 98 includes a vapor outlet to which a conduit 160 is attached, and a pair of conduits 162 and 164 are attached to the liquid outlets thereof. A pair of liquid level control valves 166 and 168 are disposed within the conduits 162 and 164, and a pair of liquid level controllers 170 and 172 attached to the separator 98 are operably connected to the valves 166 and 168 respectively.

OPERATION OF THE SYSTEM 90

The operation of the system 90 is similar to the operation of the system 10 described above in that the gas stream containing aromatic hydrocarbons and water is caused to pass upwardly within the contactor 92 into intimate contact with a stream of lean liquid absorbent having a selective affinity for aromatic hydrocarbons and water passsing downwardly therein. As stated above, a particularly suitable such liquid absorbent is an aqueous solution of triethylene glycol and/or tetraethylene glycol. As the gas stream flows through the contactor 92 aromatic hydrocarbons and water contained therein are absorbed by the liquid absorbent stream and removed from the gas stream. The thus purified gas stream is withdrawn from the contactor 92 by way of the conduit 102. The aromatic hydrocarbon and water-rich liquid absorbent accumulating in the bottom portion of the contactor 92 is withdrawn therefrom by way of the conduit 104. The liquid level controller 106 and control valve 108 function conventionally to maintain a level of rich liquid absorbent in the bottom portion of the contactor 92.

From the contactor 92 the rich liquid absorbent flows by way of the conduit 104 through the reflux condensing coil 120 disposed in the still column 112, and then by way of the conduit 130 to the heat exchange coil 98 disposed within the accumulator 96. From the heat exchange coil 98 the stream of rich liquid absorbent flows by way of the conduit 132 to the still column 112. The resulting stream of preheated rich liquid absorbent flows downwardly over the vapor-liquid contact trays 122 in the still column 112 wherein it is contacted with upwardly rising vapors which cause the absorbed aromatic hydrocarbons and at least a portion of the absorbed water to be removed therefrom. From the still column 112, the thus partially reconcentrated liquid absorbent flows into the body of hot liquid absorbent 125 maintained in the forward portion of the reboiler 110 above the firebox 114. Fuel provided to the burner assembly 116 by way of a conduit 117 connected thereto is combusted in the burner 116 producing hot products of combustion which flow through the firebox 114 and are withdrawn by way of the stack 118. Heat from the hot products of combustion is transferred into the body of liquid absorbent 125 maintaining it at a desired temperature level. From the body 125, the partially reconcentrated liquid absorbent flows over the weir 128 into a body of liquid absorbent maintained in the rearward chamber 129. A portion of the partially reconcentrated liquid absorbent accumulated in the chamber 129 is removed therefrom by way of the conduit 144 and pumped by the pump 146 through the conduits 148 and 152 and the cooler 150 into the intermediate portion of the contactor 92. The remaining partially reconcentrated liquid absorbent flows from the chamber 129 through the stripping gas column 124 wherein it is contacted by the stream of relatively dry stripping gas injected therein by way of the conduit 128. The intimate contact between the partially reconcentrated liquid absorbent flowing downwardly in the column 124 and the upwardly flowing stripping gas causes additional water to be vaporized and stripped from the partially reconcentrated liquid absorbent so that it is reconcentrated to a desired water purity. The reconcentrated liquid absorbent flows out of the column 124 into the accumulator 96.

The stripping gas and water vapor produced in the stripping gas column 124 flow through the reboiler vessel 110 into the still column 112 and are withdrawn from the still column 112 along with the aromatic hydrocarbons, water and other vapors produced in the reboiler 94 by way of the conduit 154.

The conduit 154 is connected to the condenser 156 wherein the vapors are condensed. The resulting liquid aromatic hydrocarbons are caused to flow by way of the conduit 158 to the three-phase separator 98 wherein the liquid aromatic hydrocarbons and water are separated. As described above for the system 10, uncondensed vapors are withdrawn from the separator 98 by way of the conduit 160, and liquid aromatic hydrocarbons and water are withdrawn from the separator 98 by way of the conduits 162 and 164 respectively. The level controllers 170 and 172 and control valves 166 and 168 function to maintain levels of liquid aromatic hydrocarbons and water within the separator 98.

The reconcentrated liquid absorbent stream flowing into the accumulator 96 exchanges heat with the rich liquid absorbent stream passing through the heat exchange coil 98 disposed therein and then flows by way of the conduit 134 to the pump 136. From the pump 136 the reconcentrated stream of lean liquid absorbent flows by way of the conduit 140 through the cooler 138 wherein it is cooled and then into the upper portion of the contactor 92 by way of the conduit 142.

By carrying out the method of the present invention in the system 90, the rich liquid absorbent is first subjected to heating which causes the removal of the absorbed aromatic hydrocarbons and a portion of the absorbed water, thereby producing a stream partially reconcentrated liquid absorbent. A portion of the partially reconcentrated liquid absorbent is introduced directly into the contactor 92 at an intermediate point so that the aromatic hydrocarbon and water-rich inlet gas stream is initially contacted with partially reconcentrated liquid absorbent. The portions of the partially reconcentrated liquid absorbent not pumped into the contactor 92 is caused to flow through the stripper column 124 where it is subjected to contact with stripping gas to produce a water-lean or reconcentrated stream of liquid absorbent. This highly reconcentrated stream of liquid absorbent is pumped into the upper portion of the contactor 92 so that the gas stream passing through the upper portion of the contactor 92 is contacted thereby and the resulting stream of treated gas is of the desired water purity.

The method of the present invention as carried out in the system 90 is utilized when it is required to produce an outlet gas stream of very high water and aromatic hydrocarbon purity. Since a major portion of the aromatic hydrocarbons are absorbed upon initial contact with the liquid absorbent, the liquid absorbent flowing through the lower portion of the contactor 92 can have a relatively high water content. The major portion of the water in the gas stream is removed in the upper portion of the contactor 92. Thus, by providing a highly concentrated stream of liquid absorbent to the top portion of the contactor and a partially reconcentrated stream of liquid absorbent to the bottom portion thereof, purification of the gas stream to the desired water concentration can be achieved without reconcentrating the entire stream of liquid absorbent to the highly reconcentrated level.

As will be understood by those skilled in the art, when either the system 10 or the system 90 is utilized for carrying out the method of the present invention, the flow rates of the various streams of liquid absorbent are adjusted to obtain an outlet gas stream of the desired quality. In both systems, the aromatic hydrocarbons and water are simultaneously absorbed, removed from the gas stream and recovered in liquid form.

In order to present a clear understanding of the invention, the following examples are given:

EXAMPLE 1

An 80,000 standard cubic feet per hour water saturated natural gas stream containing 450 ppm (volume) benzene flows into the contactor 12 of the system 10 by way of the conduit 16 at a pressure of 670 psia and a temperature of 100°F. A 16.8 gallon per hour stream of a lean aqueous solution of triethylene glycol (containing 0.2 percent by weight benzene) enters the contactor 12 by way of the conduit 62 at a temperature of 83°F, and the benzene and water-rich glycol stream accumulating in the bottom of the contactor (4.0 percent by weight benzene) is withdrawn therefrom at a temperature of 98°F by way of the conduit 20. The treated gas stream flows out of the contactor 12 by way of the conduit 18 at a temperature of 99°F and contains 50 ppm (volume) of benzene and a negligible quantity of water. The temperature of the triethylene glycol solution within the reboiler vessel 28 is maintained at a temperature of 400°F, and the benzene and water vapors withdrawn from the still column 32 are cooled to a temperature of 75°F and condensed while flowing through the condenser 66. Condensed benzene is recovered in the separator 68 at a rate of 0.77 gallons per hour.

EXAMPLE 2

A 79,925 standard cubic feet per hour water saturated natural gas stream containing 420 ppm (volume) benzene enters the contactor 92 of the system 90 by way of the conduit 100 at a pressure of 670 psia and a temperature of 100°F. A lean aqueous solution of triethylene glycol at a temperature of 83°F and at a total flow rate of 16.8 gallons per hour flows into the contactor 92 by way of the conduits 142 and 152, and a benzene and water-rich glycol stream (3.81% by weight benzene) is withdrawn from the contactor 92 by way of the conduit 104 at a temperature of 98°F. The treated gas stream flows out of the contactor 92 by way of the conduit 102 at a temperature of 99°F, and contains 22 ppm (volume) of benzene and a negligible amount of water. The triethylene glycol solution within the reboiler vessel 110 is maintained at a temperature of 400°F, and a stream of stripping gas at a rate of 110 standard cubic feet per hour is injected into the stripping gas column 124 by way of the conduit 128. The lean glycol solution accumulating in the vessel 96 contains 0.1% by weight benzene. The benzene and water vapors withdrawn from the still column 112 are cooled to a temperature of 73°F and condensed in the condenser 156, and condensed benzene is recovered in the separator 98 at a rate of 0.75 gallons per hour.

The present invention, therefore, is well adapted to carry out the objects and attain the ends and advantages mentioned as well as those inherent therein. while presently preferred embodiments of the invention are given for the purpose of disclosure, numerous changes in the method and arrangement of steps can be made which will readily suggest themselves to those skilled in the art, and which are encompassed within the spirit of the invention disclosed herein and the scope of the appended claims.

What is claimed is:

1. A method of removing and recovering aromatic hydrocarbons and water from a gas stream which comprises the steps of:
   a. intimately contacting said gas stream with a stream of liquid absorbent so that aromatic hydrocarbons and water contained therein are selectively and simultaneously absorbed and removed therefrom;
   b. heating the resultant stream of water and aromatic hydrocarbon rich liquid absorbent in a reboiler so that the absorbed aromatic hydrocarbons and water are vaporized and separated therefrom and the stream of liquid absorbent is reconcentrated;
   c. withdrawing the separated aromatic hydrocarbons and water vapor;
   d. recycling the reconcentrated liquid absorbent stream into intimate contact with said gas stream;
   e. condensing the withdrawn aromatic hydrocarbons and water vapors of step (c); and
   f. separating the condensed aromatic hydrocarbons from the water.

2. The method of claim 1 which is further characterized to include the step of passing the stream of water and aromatic hydrocarbon-rich liquid absorbent formed in step (a) in heat exchange relationship with the reconcentrated stream of liquid absorbent formed in step (b) so that the stream of rich liquid absorbent is preheated and the stream of reconcentrated liquid absorbent is cooled.

3. The method of claim 2 wherein the gas stream is natural gas.

4. The method of claim 3 wherein the liquid absorbent is an aqueous solution of triethylene glycol.

5. The method of claim 3 wherein the liquid absorbent is an aqueous solution of tetraethylene glycol.

6. A method of removing aromatic hydrocarbons and water from a gas stream which comprises the steps of:
   a. intimately contacting said gas stream with a stream of liquid absorbent so that said aromatic hydrocarbons and water contained therein are selectively and simultaneously absorbed and removed therefrom;
   b. heating the resultant stream of water and aromatic hydrocarbon-rich liquid absorbent in a reboiler so that the absorbed aromatic hydrocarbons and at least a portion of the absorbed water are vaporized and separated therefrom and the stream of liquid absorbent is partially reconcentrated;
   c. intimately contactng the stream of partially reconcentrated liquid absorbent with a stream of relatively dry gas so that absorbed water remaining therein is stripped and separated therefrom and the stream of liquid absorbent is reconcentrated;
   d. withdrawing the separated aromatic hydrocarbon and water vapors; and
   e. recylcing the reconcentrated liquid absorbent stream into intimate contact with said gas stream.

7. The method of claim 6 which is further characterized to include the steps of:
   condensing the withdrawn aromatic hydrocarbon and water vapors of step (d); and
   separating the condensed aromatic hydrocarbons from the water.

8. The method of claim 7 which is further characterized to include the step of passing the stream of water and artomatic hydrocarbon-rich liquid absorbent formed in step (a) in heat exchange relationship with the reconcentrated stream of liquid absorbent formed in step (c) so that the stream of rich liquid absorbent is preheated and the stream of reconcentrated liquid absorbent is cooled.

9. The method of claim 8 which is further characterized to include the step of heating the stream of relatively dry gas prior to intimately contacting the stream of partially reconcentrated liquid absorbent therewith in accordance with step (c).

10. The method of claim 8 wherein the gas stream is natural gas.

11. The method of claim 10 wherein the liquid absorbent is an aqueous solution of triethylene glycol.

12. The method of claim 10 wherein the liquid absorbent is an aqueous solution of tetraethylene glycol.

13. A method of removing and recovering aromatic hydrocarbons and water from a gas stream which comprises the steps of:
   a. intimately contacting said gas stream with a first stream of liquid absorbent so that at least a portion of the aromatic hydrocarbons and water contained therein are selectively absorbed and removed therefrom;

b. subsequently intimately contacting said gas stream with a second stream of liquid absorbent so that additional aromatic hydrocarbons and water contained therein are selectively absorbed and removed therefrom;

c. combining the resultant first and second water and aromatic hydrocarbon-rich liquid absorbent streams;

d. heating the resultant combined stream of water and aromatic hydrocarbon-rich liquid absorbent in a reboiler so that absorbed aromatic hydrocarbons and at least a portion of the absorbed water are vaporized and separated therefrom thereby partially reconcentrating said stream of liquid absorbent;

e. dividing the partially reconcentrated stream of liquid absorbent formed in step (d) into first and second streams;

f. recycling the first stream of liquid absorbent into intimate contact with said gas stream in accordance with step (a);

g. intimately contacting the second stream of partially reconcentrated liquid absorbent with a stream of relatively dry gas so that absorbed water remaining therein is stripped and separated therefrom thereby further reconcentrating the second stream of liquid absorbent;

h. withdrawing the separated aromatic hydrocarbon and water vapors; and i. recycling the second stream of liquid absorbent into intimate contact with said gas stream in accordance with step (b).

14. The method of claim 13 which is further characterized to include the step of cooling the first stream of liquid absorbent before recycling it into intimate contact with the gas stream in accordance with step (f).

15. The method of claim 14 which is further characterized to include the steps of:
condensing the withdrawn aromatic hydrocarbon and water vapors; and
separating the condensed aromatic hydrocarbons from the water.

16. The method of claim 15 which is further characterized to include the step of passing the second steam of liquid absorbent after being further reconcentrated in step (g) in heat exchange relationship with the aromatic hydrocarbon and water-rich stream of liquid absorbent formed in step (c) so that rich liquid absorbent is preheated and the reconcentrated second stream of liquid absorbent is cooled.

17. The method of claim 16 which is further characterized to include the step of heating the stream of relatively dry gas prior to intimately contacting the stream of partially reconcentrated liquid absorbent therewith in accordance with step (g).

18. The method of claim 16 wherein the gas stream is natural gas.

19. The method of claim 18 wherein the liquid absorbent is an aqueous solution of triethylene glycol.

20. The method of claim 19 wherein the liquid absorbent is an aqueous solution of tetraethylene glycol.

* * * * *